United States Patent
Kunze et al.

(10) Patent No.: US 12,228,250 B2
(45) Date of Patent: Feb. 18, 2025

(54) PRESSURE VESSEL SYSTEM AND ENERGY SUPPLY ARRANGEMENT

(71) Applicant: Bayerische Motoren Werke Aktiengesellschaft, Munich (DE)

(72) Inventors: Klaas Kunze, Poing (DE); Klaus Szoucsek, Zirndorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/786,779

(22) PCT Filed: Dec. 7, 2020

(86) PCT No.: PCT/EP2020/084889
§ 371 (c)(1),
(2) Date: Jun. 17, 2022

(87) PCT Pub. No.: WO2021/122107
PCT Pub. Date: Jun. 24, 2021

(65) Prior Publication Data
US 2023/0026657 A1    Jan. 26, 2023

(30) Foreign Application Priority Data

Dec. 17, 2019 (DE) ..................... 10 2019 134 643.6

(51) Int. Cl.
*F17C 13/02* (2006.01)
*F17C 7/00* (2006.01)

(52) U.S. Cl.
CPC .............. *F17C 13/025* (2013.01); *F17C 7/00* (2013.01); *F17C 2250/032* (2013.01);
(Continued)

(58) Field of Classification Search
CPC .... F17C 13/025; F17C 7/00; F17C 2250/032; F17C 2250/0417; F17C 2250/043; F17C 2250/0689; G01F 1/46; G01F 3/22
(Continued)

(56) References Cited

U.S. PATENT DOCUMENTS 2,519,624 A * 8/1950 Havelock .................. F02K 3/00
244/78.1
2,809,492 A * 10/1957 Arkawy .................... F02C 9/28
60/240
(Continued)

FOREIGN PATENT DOCUMENTS

CN    202720007 U    2/2013
CN    204439269 U    7/2015
(Continued)

OTHER PUBLICATIONS

WO-2007065771-A1—English Translation (Year: 2002).*
(Continued)

*Primary Examiner* — Timothy L Maust
*Assistant Examiner* — Christopher M Afful
(74) *Attorney, Agent, or Firm* — Crowell & Moring LLP

(57) ABSTRACT

A pressure vessel system has a pressure vessel for storing gaseous fuel, a fuel line, and a total-pressure sensor for measuring a total pressure of the fuel at a position within the fuel line. This makes it possible for various functions, such as the control of power reduction, for example, to be performed more accurately than if only static pressure were being used. The technology disclosed here also relates to an energy supply arrangement having such a pressure vessel system and having an energy converter, such as a fuel cell, for example.

20 Claims, 2 Drawing Sheets

(52) U.S. Cl.
CPC .............. *F17C 2250/0417* (2013.01); *F17C 2250/043* (2013.01); *F17C 2250/0689* (2013.01)

(58) Field of Classification Search
USPC .......................................................... 141/37
See application file for complete search history.

(56) References Cited

U.S. PATENT DOCUMENTS

| | | | | |
|---|---|---|---|---|
| 4,524,034 | A * | 6/1985 | Ellison | F02M 9/06 261/44.2 |
| 4,823,615 | A * | 4/1989 | Taha | G01F 1/46 73/861.66 |
| 5,146,941 | A * | 9/1992 | Statler | G05D 7/0635 137/8 |
| 5,564,306 | A | 10/1996 | Miller | |
| 5,661,232 | A * | 8/1997 | Van Cleve | G01N 11/04 73/32 R |
| 6,283,142 | B1 * | 9/2001 | Wheeler | F02M 37/0094 123/514 |
| 9,464,573 | B2 * | 10/2016 | Remy | F02C 7/22 |
| 2009/0022578 | A1 | 1/2009 | Weymann | |
| 2016/0133972 | A1 * | 5/2016 | Yamamoto | H01M 8/04164 429/414 |
| 2016/0306365 | A1 * | 10/2016 | Wilson | B23P 15/001 |
| 2018/0138528 | A1 | 5/2018 | Komiya | |
| 2021/0002072 | A1 | 1/2021 | Koenig et al. | |
| 2021/0040951 | A1 * | 2/2021 | Shellef | F04D 1/12 |

FOREIGN PATENT DOCUMENTS

| | | | |
|---|---|---|---|
| CN | 107820537 A | | 3/2018 |
| CN | 209639791 U | | 11/2019 |
| DE | 10 2006 009 295 A1 | | 9/2007 |
| DE | 10 2017 209 352 A1 | | 12/2018 |
| DE | 10 2018 106 786 A1 | | 9/2019 |
| DE | 10 2018 220 684 A1 | | 6/2020 |
| EP | 3 772 590 A1 | | 2/2021 |
| JP | 2005-3678 A | | 1/2005 |
| JP | 3648724 B2 * | | 5/2005 |
| RU | 87 519 U1 | | 10/2009 |
| WO | WO-2007065771 A1 * | 6/2007 | ......... F02M 25/0809 |

OTHER PUBLICATIONS

JP-3648724-B2—English Translation (Year: 2005).*
Chinese-language Office Action issued in Chinese Application No. 202080086998.5 dated Apr. 13, 2023 with English translation (16 pages).
Guo et al., "Thermal Engineering Experiment", Metallurgical Industry Press, Sep. 2015, pp. 44-46, (10 pages).
International Search Report (PCT/ISA/210) issued in PCT Application No. PCT/EP2020/084889 dated Mar. 15, 2021 with English translation (four (4) pages).
German-language Written Opinion (PCT/ISA/237) issued in PCT Application No. PCT/EP2020/084889 dated Mar. 15, 2021 (six (6) pages).
German-language Search Report issued in German Application No. 10 2019 134 643.6 dated Sep. 10, 2020 with partial English translation (11 pages).

* cited by examiner

PRESSURE VESSEL SYSTEM AND ENERGY SUPPLY ARRANGEMENT

BACKGROUND AND SUMMARY

The technology disclosed here relates to a pressure vessel system and to an energy supply arrangement with such a pressure vessel system.

A pressure vessel system has for example a pressure vessel for storing gaseous fuel. It also typically has a fuel line, which is connected to the pressure vessel. The fuel line may for example be connected to a consumer or an energy converter.

In certain situations, it is necessary to measure the pressure in the fuel line. Up to now static-pressure sensors have typically been used for this, but they have not been found to be optimum for some intended uses.

It is a preferred object of the technology disclosed here to reduce or eliminate at least one disadvantage of a previously known solution or to propose an alternative solution. It is in particular a preferred object of the technology disclosed here to provide a pressure vessel system that has improved pressure measurement. Further preferred objects may be evident from the advantageous effects of the technology disclosed here. The objects are achieved by the subject matter of the independent patent claims. The dependent claims present preferred refinements.

The technology disclosed here relates to a pressure vessel system. The pressure vessel system has at least one pressure vessel for storing gaseous fuel. The pressure vessel system has at least one fuel line, which is connected to the pressure vessel. The pressure vessel system has at least one total-pressure sensor for measuring a total pressure of the fuel at a position within the fuel line.

The pressure vessel system may also have a number of pressure vessels for storing gaseous fuel. For the case where there are a number of pressure vessels, the fuel line may be connected to each of the pressure vessels.

A total-pressure sensor is a sensor which does not just measure the static pressure but a combination of static pressure and dynamic pressure. The dynamic pressure becomes all the greater the greater a flow rate of the fuel in the fuel line is. It has been found that, in some applications, measuring the static pressure alone has the result that various functions may be performed less well when the correspondingly measured value is used. This is because the measured value of the static pressure is ultimately too low in comparison with the total pressure, which should actually be used for the corresponding function. This effect becomes all the greater the higher the flow rate in the fuel line is, since the proportion accounted for by the dynamic pressure is correspondingly greater.

The fuel line connects in particular one or more pressure vessels to one or more consumers. Consequently, the position within the fuel line is arranged within such a line. The total pressure is measured there. A pressure sensor which is connected to the fuel line by way of a separate connection line typically cannot measure the total pressure for physical reasons alone, since only the static pressure is conveyed via the connection line.

For example, it may be provided that, when a pressure vessel is almost empty, the power output of a connected consumer, for example, a fuel cell system or some other energy converter, or a removal mass flow is reduced, because the gas density is very low and as a result a pressure-controller output pressure threatens to become too low. Such a pressure controller may for example be connected between the fuel line and a connected energy converter. The reduction in the power output may for example be implemented such that, when the measured value of a pressure sensor is less than for example 40 bar, a tank controller requests a fuel-cell controller to reduce the power output. The fuel-cell controller then reduces the power output of the fuel cell and consequently lowers the removal flow in the tank system.

For example, the fuel may be hydrogen, which can be used in fuel cells.

It has been found that, when a conventional static-pressure sensor is used, the static pressure measured at a specific location fluctuates in dependence on the mass flow. At greater mass flows, a smaller static pressure is measured. These measured value fluctuations lead to the problem that the reduction in the power output commences earlier than necessary when there is a high mass flow. When there is a low mass flow, the reduction in the power output is activated later than when there is a high mass flow, but still earlier than necessary.

The problems just described can be prevented by the technology disclosed here, since the total pressure is measured and not just the static pressure.

The total-pressure sensor may be in particular a pressure sensor for dynamic pressure. It may have a bore which is aligned so as to be oriented counter to the direction of gas flow. Such a total-pressure sensor measures the total pressure, that is to say, the sum of the static pressure and the dynamic pressure. The total pressure is independent of the mass flow. As a result, the reduction in the power output is no longer activated prematurely.

The pressure vessel may for example serve for storing fuel that is gaseous under ambient conditions. The pressure vessel may for example be used in a motor vehicle which is operated by compressed natural gas (also known as CNG) or liquefied natural gas (also known as LNG) or by hydrogen. The pressure vessel is preferably fluidically connected to at least one energy converter, in particular, by the already mentioned fuel line. The energy converter typically is set up to convert the chemical energy of the fuel into other forms of energy.

A pressure vessel may be for example a composite overwrapped pressure vessel. The pressure vessel may be for example a cryogenic pressure vessel or a high-pressure gas vessel. High-pressure gas vessels are designed to store fuel at ambient temperatures permanently at a nominal operating pressure (also known as "nominal working pressure" or NWP) of about 350 bar(g) (=gage pressure above atmospheric pressure), also preferably of about 700 bar(g) or more. A cryogenic pressure vessel is suitable for storing the fuel at the aforementioned operating pressures even at temperatures that lie well below the operating temperature of the motor vehicle.

According to one embodiment, a fuel line is a removal line, and the total-pressure sensor preferably measures the total pressure when the fuel is flowing away from the pressure vessel. This allows for example a removal mass flow to be monitored and corresponding functionality, for example a reduction in the power output of a consumer as just described, to be controlled. The removal line may in particular be connected to a consumer or an energy converter, such as for example a fuel cell or a gas-operated internal combustion engine.

According to one embodiment, a fuel line is a tank-filling line, and the total-pressure sensor preferably measures the total pressure when the fuel is flowing toward the pressure vessel. This allows a tank-filling operation to be monitored.

This can be used for example for a filling level determination, which is improved by determining the total pressure. The tank-filling mass flow may for example be ten times the removal mass flow. As a result, the proportion of the total pressure accounted for by the dynamic pressure is greater and the advantages particularly come into effect in tank filling.

The filling level of a pressure vessel is a measure of the amount of fuel that is stored in the pressure vessel. The filling level or state of charge may be an absolute value, for example, the fuel storage pressure or the fuel storage density of the fuel stored in the pressure vessel. The filling level may however also be a percentage value, which is obtained from the amount actually stored in the pressure vessel and maximum and minimum storage amounts. Such a percentage value may be referred to for example as the degree of filling (or the "state of charge" or SOC). The degree of filling may be for example a percentage value of the maximum fuel storage pressure or density or of the difference between the maximum and minimum fuel storage pressure or density. The maximum fuel storage pressure has generally been reached when, under normal conditions, the pressure vessel has reached the nominal operating pressure (also known as "nominal working pressure" or NWP; for example 700 bar) at nominal operating temperature (for example 15° C.). The minimum fuel storage pressure may be a fixed minimum pressure (generally vessel-specific) or atmospheric pressure. The maximum fuel storage density and the minimum fuel storage density are obtained as it were under these normal conditions. In the case of a 70 MPa pressure vessel system, the maximum storage density in a hydrogen pressure vessel at 15° C. is for example about 40.22 g/l. The filling state may be determinable directly or indirectly.

It should be mentioned that the arrangement of a total-pressure sensor in a removal line and in a tank-filling line may also be combined. In this case, for example, two such total-pressure sensors may therefore be used.

The pressure vessel system preferably has an electronic control device for calculating a filling level of the pressure vessel on the basis of the total pressure in the tank-filling line. This allows a filling level to be calculated in a particularly advantageous way, since the total pressure that is better suited for this is used, and not just the static pressure.

It may be provided that the total-pressure sensor can measure the total pressure in both directions of flow. For this purpose, it may for example be rotatably designed, so that an inlet opening can be kept in both directions of flow. Consequently, the total pressure can be measured for example both during a tank-filling operation and during a removal operation.

According to one embodiment, the pressure vessel system also has a static-pressure sensor for measuring a static pressure of the fuel at a position within the fuel line. As a result, the static pressure can also be measured in addition to the total pressure. This allows additional functionalities to be achieved. In particular, the dynamic pressure can be calculated by subtracting the static pressure from the total pressure.

The total-pressure sensor and the static-pressure sensor may in particular be arranged directly adjacent to one another. This may mean for example that they are at a distance of at most 10 cm. It can then be said for example that they measure at the same point and any variation of the pressure over the distance can be ignored.

A combination of the total-pressure sensor and the static-pressure sensor can in principle be used at any point, for example as described further below in a tank-filling line and in a removal line.

According to one embodiment, the pressure vessel system has an electronic control device for calculating a dynamic pressure as a difference from the total pressure and the static pressure and/or for calculating a flow rate from the total pressure and the static pressure and/or from the dynamic pressure. By means of such a procedure, the flow rate can be calculated particularly accurately, since both the total pressure and the dynamic pressure are known. The flow rate can also be used for example for controlling other functions. The control device is expediently configured for such a function or else for other functions as described below.

According to one embodiment, the pressure vessel system has an electronic control device for triggering a reduction in the power output of an energy converter connected to the pressure vessel system on the basis of the total pressure. As already mentioned, the use of the total pressure instead of the static pressure has the effect that the reduction in the power output can be controlled much better; in particular, premature triggering can be avoided.

It should be mentioned that the described functionalities may for example also be implemented in a single control device.

In particular, the control device may be configured to perform the respective functionality.

A reduction in the power output may for example be activated when a pressure in the pressure vessel is close to a predetermined lower limit value. Similarly, a reduction in the power output may for example be triggered when the pressure upstream of a pressure controller is less than 35 bar. In such a case, for example, a loss of pressure in the pressure controller may increase as a result of a low gas density, and a pressure-controller output pressure may then become too small.

A temperature compensation may preferably be implemented, for example, in an already mentioned control device. If the temperature fluctuates for example between −15° C. and +45° C., and it is assumed to be for example 15° C. because it is not measured, then a hydrogen density may be determined falsely by for example +/−10%. This effect can be avoided by a temperature compensation, i.e. by measuring and making allowance for the temperature. For example, a temperature sensor may be installed upstream of a pressure controller. The temperature sensor may measure the gas temperature of the removal mass flow by way of a line protruding into the flow. This can be used for example to calculate a gas density, which is temperature-dependent.

The total-pressure sensor may be installed in particular at a point at which the flow profile is as uniform as possible over the cross section. This can preferably be achieved by including a straight length of tube, of for example at least 20 cm, upstream of the gas pressure sensor.

The technology disclosed here also relates to an energy supply arrangement with a pressure vessel system as described herein and with an energy converter, which may expediently be embodied as a fuel cell, where the energy converter is connected to the fuel line. The energy converter or the fuel cell may be designed in particular for converting fuel delivered from the pressure vessel by way of the fuel line into electrical or mechanical energy. In the case of a fuel cell, in particular the aforementioned advantage of better control of the reduction in the power output can be used. More generally, an energy converter which is set up to convert the chemical energy of the fuel into other forms of energy, for example into electrical energy or into kinetic energy, may be used. The energy converter may be for example an internal combustion engine or a fuel cell system/fuel cell stack with at least one fuel cell.

A mass flow density or a mass flow may for example be calculated by the following formulae:

$$p\_dyn = \rho/2 * v^2$$

$$v = \sqrt{((2 \cdot p\_dyn)/\rho)}$$

$$\dot{m} = \rho \cdot v \cdot A$$

where:
p_dyn: dynamic pressure
v: flow rate
ρ: gas density
A: flow cross-sectional area
ṁ: mass flow The determination of a hydrogen mass flow has the advantage for example that it can be used for improving the filling-level calculation by means of a Kalman filter.

DETAILED DESCRIPTION

Figure 1:
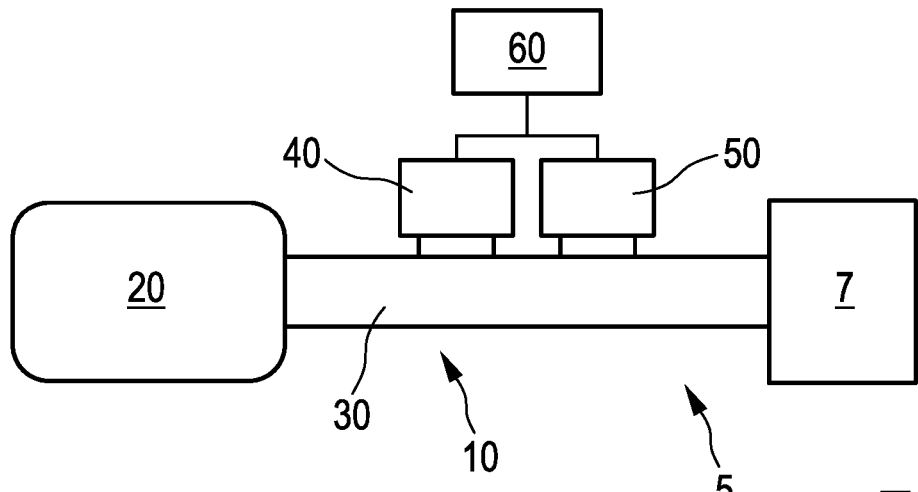
FIG. 1 shows an energy supply arrangement.

FIG. 1 shows an energy supply arrangement 5 according to an exemplary embodiment in a purely schematic representation. The energy supply arrangement 5 has a pressure vessel system 10 and an energy converter connected thereto in the form of a fuel cell 7. It should be mentioned that, instead of the fuel cell 7, for example some other energy converter, such as for example a gas-operated internal combustion engine, may be connected. In any event, the connected energy converter is supplied with a gaseous fuel, for example hydrogen, by the pressure vessel system 10 as described below.

The pressure vessel system 10 has a pressure vessel 20 in which gaseous fuel is stored. The pressure vessel system 10 has a fuel line 30, which, as shown, leads from the pressure vessel 20 to the fuel cell 7. Furthermore, the pressure vessel system 10 may have a total-pressure sensor 40 and a static-pressure sensor 50. The total-pressure sensor 40 is designed to measure a total pressure in the fuel line 30, i.e. a combination of static pressure and dynamic pressure, the latter being dependent on the flow rate. By contrast, the static-pressure sensor 50 only measures the static pressure, that is to say, the total pressure minus the dynamic pressure.

The pressure vessel system 10 also has an electronic control device 60, which, as shown, is connected to the two pressure sensors 40, 50.

During a removal operating mode, i.e. while the fuel cell 7 is being supplied with fuel from the pressure vessel 20, the total-pressure sensor 40 measures the total pressure and the static-pressure sensor 50 measures the static pressure. Both values are sent to the electronic control device 60. This can calculate the mass flow from a difference between the two pressures and thereby control the removal in an advantageous way. It is also possible in this way for a filling level to be deduced. Should the total pressure fall below a predetermined value, which may for example lie at 40 bar, the electronic control device 60 can request a reduction in the power output of the fuel cell 7, so that the removal decreases. Since the total pressure is used, and not just the static pressure, the reduction in the power output can commence later here than when only the static pressure is used, as is usual in the case of embodiments in the prior art.

Figure 2:
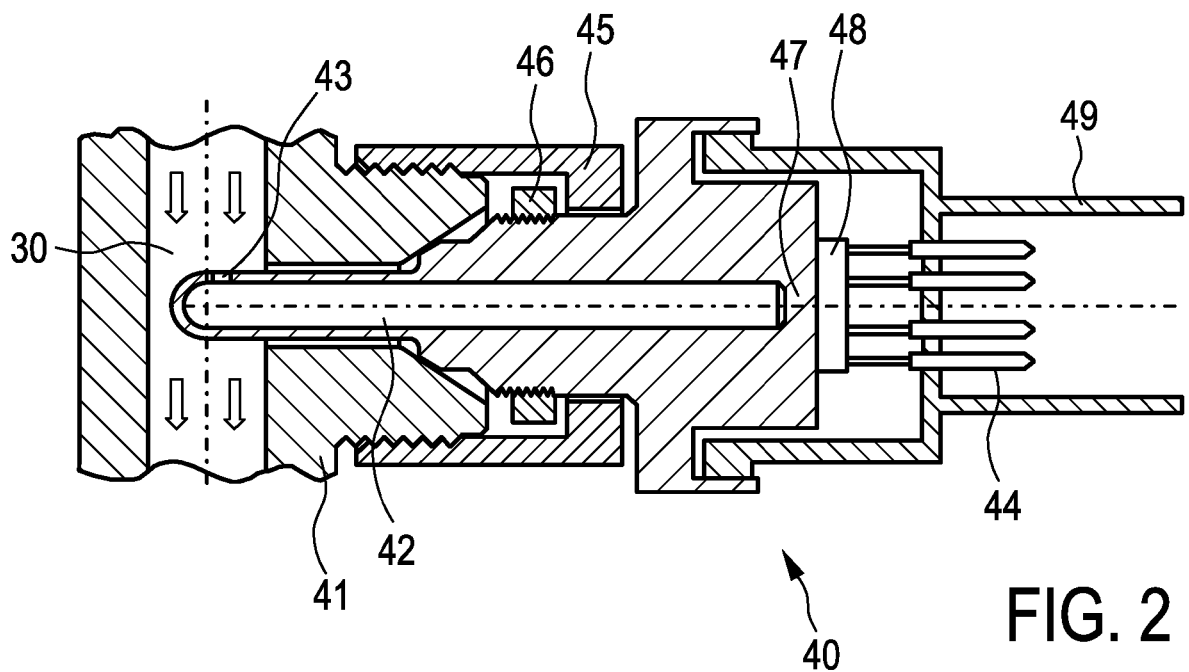
FIG. 2 shows a total-pressure sensor, where the gaseous fuel in the fuel line flows as indicated by the arrows during a typical removal operating mode.
Figure 3:
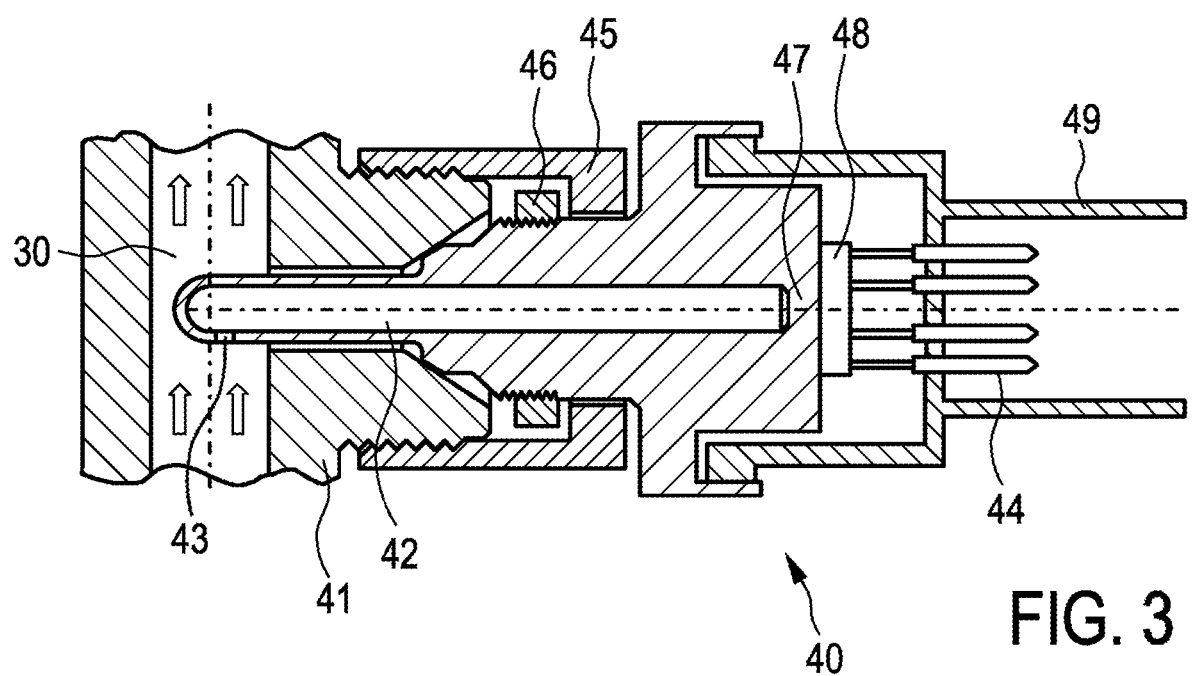
FIG. 3 shows the total-pressure sensor of FIG. 2, where the gaseous fuel in the fuel line flows as indicated by the arrows during a typical tank-filling operating mode.

FIG. 2 shows the total-pressure sensor 40 in more detail. In this case, its connection to the already mentioned fuel line 30 is also shown. In the fuel line 30, the gas flows as indicated by the arrows during a typical removal operating mode. The total-pressure sensor 40 has a block 41, which is connected to the fuel line 30 and which carries further components of the total-pressure sensor 40. The total-pressure sensor 40 has a tube 42, which protrudes into the fuel line 30. In the fuel line 30, the tube 42 has an opening 43, which faces counter to the direction of flow and consequently ensures that flowing gas penetrates into the tube 42 under pressure.

On the outside, the total-pressure sensor 40 has a union nut 45 and a supporting ring 46, which hold further components on the block 41 and provide stability.

Formed on the tube 42 opposite from the fuel line 30 is a membrane 47, which deforms pressure-dependently. Arranged directly adjacent thereto is an evaluation circuit 48, which records the deformation and outputs a signal dependent thereon by way of pins 44 integrated on the circuit and pointing to the right. Consequently, the signal indicates the deformation of the membrane 47, and thus ultimately the total pressure. On account of the already mentioned formation of the tube 42 and the opening 43, not just the static pressure, but the total pressure is measured here. If the opening 43 were not directed, but were only laterally adjacent to the fuel line 30, only the static pressure would be measured.

The evaluation circuit 48 is carried by a connector housing 49, in which the already mentioned pins 44 are also fastened. This housing is clipped to the rest of the total-pressure sensor 40.

For reasons of readability, the term "at least one" has sometimes been omitted for the sake of simplicity. If a feature of the technology disclosed here is described in the singular or with an indefinite article (for example, the/a pressure vessel, the/a sensor, etc.), its plurality is also intended to be disclosed at the same time (for example the at least one pressure vessel, the at least one sensor, etc.).

The foregoing description of the present invention serves only for illustrative purposes and not for the purpose of restricting the invention. Various changes and modifications are possible within the context of the invention without departing from the scope of the invention and the equivalents thereof.

LIST OF DESIGNATIONS

5: Energy supply arrangement
7: Fuel cell
10: Pressure vessel system
20: Pressure vessel
30: Fuel line
40: Total-pressure sensor
41: Block
42: Tube
43: Opening
44 Pins
45: Union nut 46: Supporting ring
47: Membrane
48: Evaluation circuit
49: Connector housing
50: Static-pressure sensor
60: Electronic control device

The invention claimed is:

1. A pressure vessel system in a motor vehicle, the pressure vessel system comprising:
 a pressure vessel in the motor vehicle for storing gaseous fuel;
 a fuel line connected to the pressure vessel;
 a total-pressure sensor connected to the fuel line for measuring a total pressure of the gaseous fuel at a position within the fuel line, wherein
  the total-pressure sensor is configured to measure the total pressure in both directions of flow, the total-pressure sensor being rotatably connected to the fuel line,
  the total-pressure sensor is rotatably designed, so that an inlet opening can be kept in both directions of flow, and
  the total-pressure sensor is configured to measure the total pressure when the gaseous fuel is flowing away from and toward the pressure vessel.

2. The pressure vessel system according to claim 1, wherein
 the fuel line is a removal line, and
 the total-pressure sensor is configured to measure the total pressure when the gaseous fuel is flowing away from the pressure vessel.

3. The pressure vessel system according to claim 1, wherein
 the fuel line is a tank-filling line, and
 the total-pressure sensor is configured to measure the total pressure when the gaseous fuel is flowing toward the pressure vessel.

4. The pressure vessel system according to claim 1, further comprising:
 an electronic control device for calculating a filling level of the pressure vessel based on the total pressure in the tank-filling line.

5. The pressure vessel system according to claim 1, wherein
 the total pressure sensor includes a tube having an opening in the fuel line, the opening being configured to face counter to a flow direction of the fuel.

6. The pressure vessel system according to claim 1, further comprising:
 a static-pressure sensor connected to the fuel line for measuring a static pressure of the gaseous fuel at the position within the fuel line.

7. The pressure vessel system according to claim 6, wherein
 the total-pressure sensor and the static-pressure sensor are directly adjacent to one another.

8. The pressure vessel system according to claim 6, wherein
 the static-pressure sensor and the total-pressure sensor are positioned at most a distance of 10 cm from each other.

9. The pressure vessel system according to claim 6, further comprising:
 an electronic control device connected to the total-pressure sensor and the static-pressure sensor.

10. The pressure vessel system according to claim 9, wherein
 the electronic control device is configured for calculating a dynamic pressure as a difference from the total pressure and the static pressure, and/or for calculating a flow rate from the total pressure and the static pressure and/or from the dynamic pressure.

11. The pressure vessel system according to claim 1, further comprising:
 an electronic control device connected to the total-pressure sensor, and
 wherein the electronic control device is configured for triggering a reduction in power output of an energy converter connected to the pressure vessel system based on the total pressure.

12. An energy supply arrangement, comprising:
 a pressure vessel system according to claim 1; and
 an energy converter connected to the pressure vessel by the fuel line.

13. A method of measuring pressure in a fuel line of an energy supply arrangement in a motor vehicle, the method comprising:
 providing in the motor vehicle a pressure vessel containing a gaseous fuel, an energy converter connected to the pressure vessel by a fuel line, and a total-pressure sensor connected to the fuel line;
 flowing the gaseous fuel through the fuel line; and
 measuring a total-pressure using the total-pressure sensor, wherein
  the total-pressure sensor is rotatably connected to the fuel line, and thereby configured to measure the total pressure in both directions of flow,
  the total-pressure sensor is rotatably designed, so that an inlet opening can be kept in both directions of flow, and
  the total-pressure sensor is configured to measure the total pressure when the gaseous fuel is flowing away from and toward the pressure vessel.

14. The method of claim 13, wherein
 the fuel line is a removal line, and
 the total pressure is measured when the gaseous fuel is flowing away from the pressure vessel.

15. The method of claim 13, wherein
 the fuel line is a tank-filling line, and
 the total pressure is measured when the gaseous fuel is flowing toward the pressure vessel.

16. The method of claim 13, further comprising:
 providing a static-pressure sensor connected to the fuel line; and
 an electronic control device connected to the total-pressure sensor and the static-pressure sensor.

17. The method of claim 16, further comprising:
 measuring a static pressure using the static-pressure sensor;
 sending the total pressure and the static pressure to the electronic control device; and
 calculating a mass flow from a difference between the total pressure and the static pressure.

18. The method of claim 13, further comprising:
 triggering a reduction in power output of the energy converter based on the total pressure.

19. The pressure vessel system according to claim 1, further comprising a fuel cell connected to the pressure vessel in the motor vehicle by the fuel line.

20. The method of claim 13, wherein the energy converter is a fuel cell.

* * * * *